United States Patent [19]
Voith et al.

[11] Patent Number: 5,737,337
[45] Date of Patent: Apr. 7, 1998

[54] METHOD AND APPARATUS FOR INTERLEAVING DATA IN AN ASYMMETRIC DIGITAL SUBSCRIBER LINE (ADSL) TRANSMITTER

[75] Inventors: Raymond P. Voith; Sujit Sudhaman, both of Austin, Tex.

[73] Assignee: Motorola, Inc., Schaumburg, Ill.

[21] Appl. No.: 723,032

[22] Filed: Sep. 30, 1996

[51] Int. Cl.⁶ .................................................. H03M 13/22
[52] U.S. Cl. ...................................... 371/2.2; 371/39.1
[58] Field of Search ............................... 371/2.2, 39.1

[56] References Cited

U.S. PATENT DOCUMENTS

| | | | |
|---|---|---|---|
| 5,495,483 | 2/1996 | Grube et al. | 370/95.1 |
| 5,596,604 | 1/1997 | Cioffi et al. | 345/260 |
| 5,636,224 | 6/1997 | Voith et al. | 371/2.1 |

OTHER PUBLICATIONS

Alliance for Telecommunications Industry Solutions, "Asymmetric Digital Subscriber Line (ADSL) Metallic Interface", Draft American National Standard for Telecommunications, Network and Customer Installation Interfaces, T1E1.4/94–007R7, pp. i–xii and pp. 2–171.

Tong, et al., "Revised FEC and Interleaving Recommendations for DMT ADSL", Amati Communications Corp., pp. 2–6; May 10, 1993.

Ramsey, John L., "Realization of Optimum Interleavers"; IEEE Transactions on Information Theory, vol. IT–16; pp. 338–345; May 1970.

Primary Examiner—Stephen M. Baker

[57] ABSTRACT

In an ADSL transmitter (62), data is flamed and split between a fast path and an interleave path by multiplexer (66). Data is forward error correction encoded in FEC encoder (70). Data on the interleave path is interleaved by interleaver (72) if an interleave depth (D) is >2. During interleaving, at least one additional read operation is performed, after a series of consecutive write and read operations. The additional read operation permits interleaving to continue without waiting for a next frame of data to arrive at the interleaver. An equal number of additional write operations compensates for the additional reads at a later point. Use of an interleaving memory can also be avoided by turning off or disabling the interleaver, while still permitting data to be sent along the interleave path. Transmit path controller (74) senses if D=1, and if so disables the interleaver and avoids the need for interleaver memory (64).

25 Claims, 6 Drawing Sheets

METHOD AND APPARATUS FOR INTERLEAVING DATA IN AN ASYMMETRIC DIGITAL SUBSCRIBER LINE (ADSL) TRANSMITTER

CROSS REFERENCE TO RELATED APPLICATION

The present invention is related to a commonly assigned, co-pending application filed by Voith et al. entitled, "Method and Apparatus for Interleave/De-Interleave Addressing in Data Communication Circuits," having U.S. Ser. No. 430,668, filed Apr. 28, 1995.

FIELD OF THE INVENTION

This invention relates generally to data communications systems, and more particularly, to methods for interleaving data in an asymmetric digital subscriber line (ADSL) transmitter.

BACKGROUND OF THE INVENTION

In order to make high data rate interactive services, such as video conferencing, video-on-demand, and internet usage, available to more residential and small business customers, high-speed data communication paths are required. Although fiber optic cable is the preferred transmission media for such high data rate services, it is not readily available in existing communications networks, and the expense of installing fiber optic cable is prohibitive. Current telephone wiring connections, which consist of copper twisted-pair media, are not designed to support the data rates, or bandwidth, required for interactive services. Asymmetric Digital Subscriber Lines (ADSL) technology has been developed to increase the effective bandwidth of existing twisted-pair connections, allowing interactive services to be provided without requiring the installation of new fiber optic cable.

Discrete Multi-Tone (DMT) is a multicarrier technique that divides the available bandwidth of existing twisted-pair connections into many subchannels. The DMT technique has been adopted by the ANSI T1E1.4 committee for use in ADSL systems. In ADSL, DMT is used to generate 256 separate 4.3125 kHz subchannels from 26 kHz to 1.1 MHz for downstream transmission to the end user, and 32 subchannels from 26 kHz to 138 kHz for upstream transmission by the end user. The transmission capability of the individual subchannels are evaluated for each connection, and data is allocated to the subchannels according to their transmission capabilities (the number of bits each subchannel can support). Subchannels that are not capable of supporting data transmission are not used, whereas the bit-carrying capacity of subchannels that can support transmission is maximized. Thus, by using DMT in an ADSL system, the transmission capability of each twisted-pair connection is maximized over the fixed bandwidth.

Figure 1:
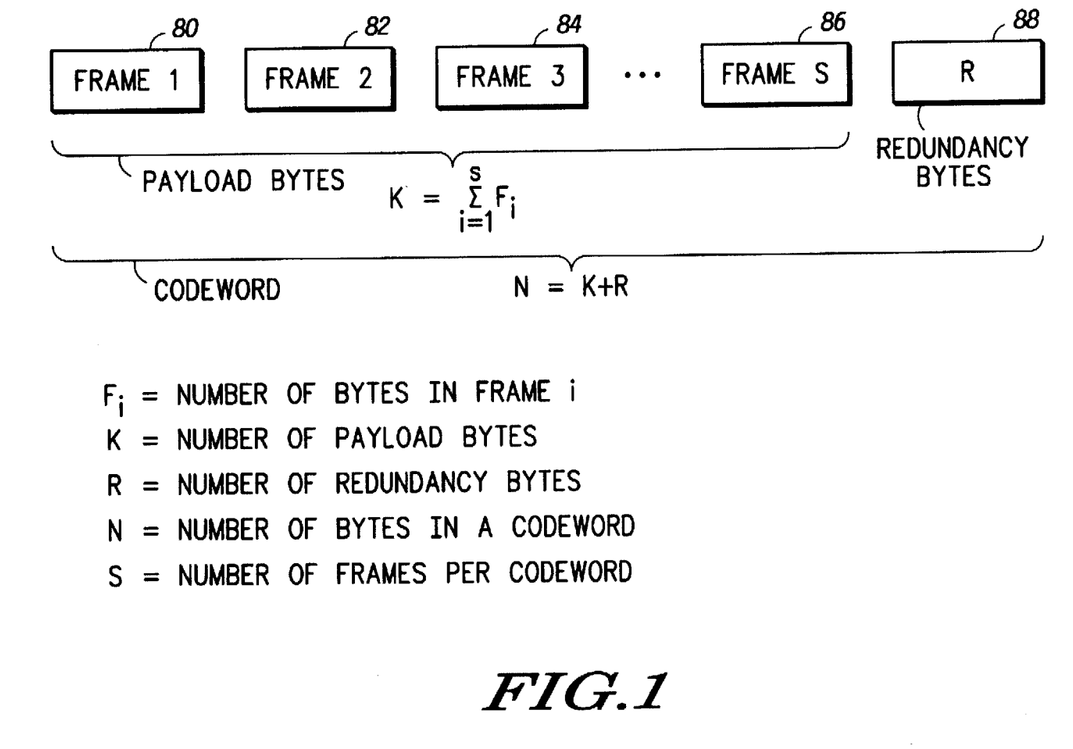
FIG. 1 is a representation of flames and codewords after forward error correction encoding, as used in ADSL communication systems.

In many digital data transmission schemes including ADSL, data bytes are subjected to forward error correction techniques before being transmitted across a noisy channel. This involves addition of redundant information to the basic data, also known as payload data. The data bytes and redundant bytes together form a unit called a codeword. Redundant bytes are generally added on to the data bytes to form the last bytes of the codeword, as represented in FIG. 1. FIG. 1 illustrates frames 80, 82, 84, and 86 of digital information which includes basic data bytes. The number of flames (S) in a codeword is user selectable and is dependent on the number of payload bytes in a frame and the maximum size of a codeword. As a result of using a forward error correction technique, a group of redundancy bytes 88 are added to the S frames of payload data to form a codeword having a length of N bytes, which equals the number of redundancy bytes (R) plus the aggregate number of basic data bytes (K) for the S frames of data. The redundant bytes allows a degree of error detection and correction at the receiving end of the communication system.

An enhancement of merely using a forward error correction scheme involves shuffling or interleaving the bytes of data before transmission, then unshuffling or deinterleaving the bytes at the receiving end. The purpose of interleaving is to ensure that bursts of noise during transmission do not cause too many errors in any individual codeword. If noise affects a particular frame of data, only a minimal number of bytes of data of any given codeword will be affected since bytes of a codeword will be spaced over many flames, each frame containing bytes from multiple codewords.

Figure 2:
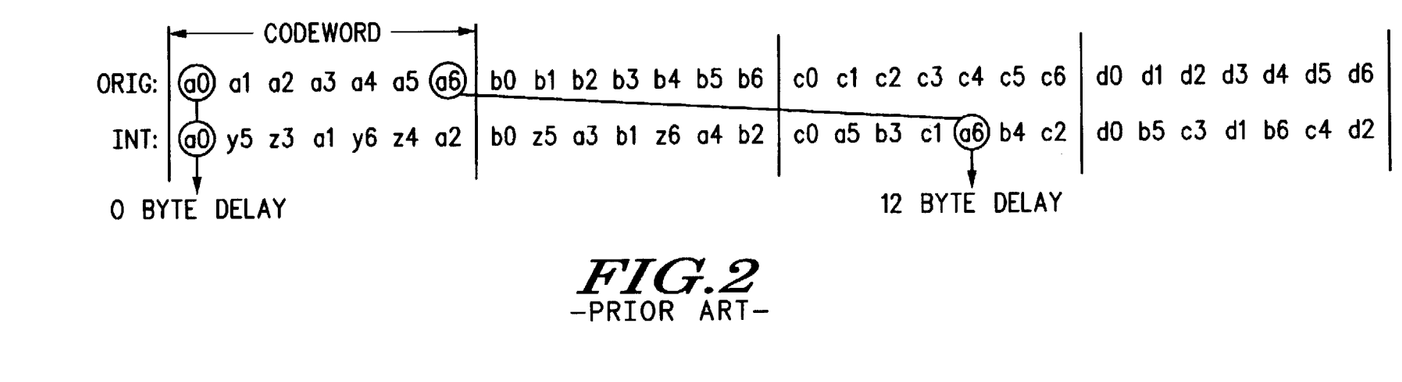
FIG. 2 illustrates a known concept of interleaving bytes of a codeword as defined by standard T1E1.4-95-007R2 for ADSL transmission.

The type of interleaving used in ADSL communication systems is known as convolutional interleaving. Convolutional interleaving is controlled by two parameters: 1) the number of bytes to be interleaved (N), and 2) the depth of interleaving (D). Convolutional interleaving as applied to ADSL is defined in the American National Standard for Telecommunications-Network and Customer Installation Interfaces-ADSL Metallic Interface standard (T1E1.4-95-007R2) by the following rule: each of the N bytes in a codeword ($B_0, B_1, \ldots B_{N-1}$) is delayed by an amount that varies linearly with the byte index. More precisely, byte $B_i$ is delayed by $(D-1)*i$ bytes. An example for N=7 and D=3 is shown in FIG. 2, where $x_i$ denotes ith byte of the xth codeword. As shown, the ath codeword consisting of bytes a0 through a6 is interleaved such that the bytes no longer are transmitted consecutively, but are rather linearly spaced apart according to the equation given above. Upon interleaving, as shown, byte a0 is delayed by 0 bytes ($(3-1)*0=0$) while byte a6 is delayed by 12 bytes ($(3-1)*6$). As a result of interleaving, basically each arriving byte of the ath codeword is delayed (e.g. stored in a interleaver) for later use, and a previously delayed byte is sent out in place thereof. The additional bytes (e.g., y5 and z3) are bytes read from interleaver memory addresses which are dedicated for specific bytes of previously interleaved codewords.

Figure 3:
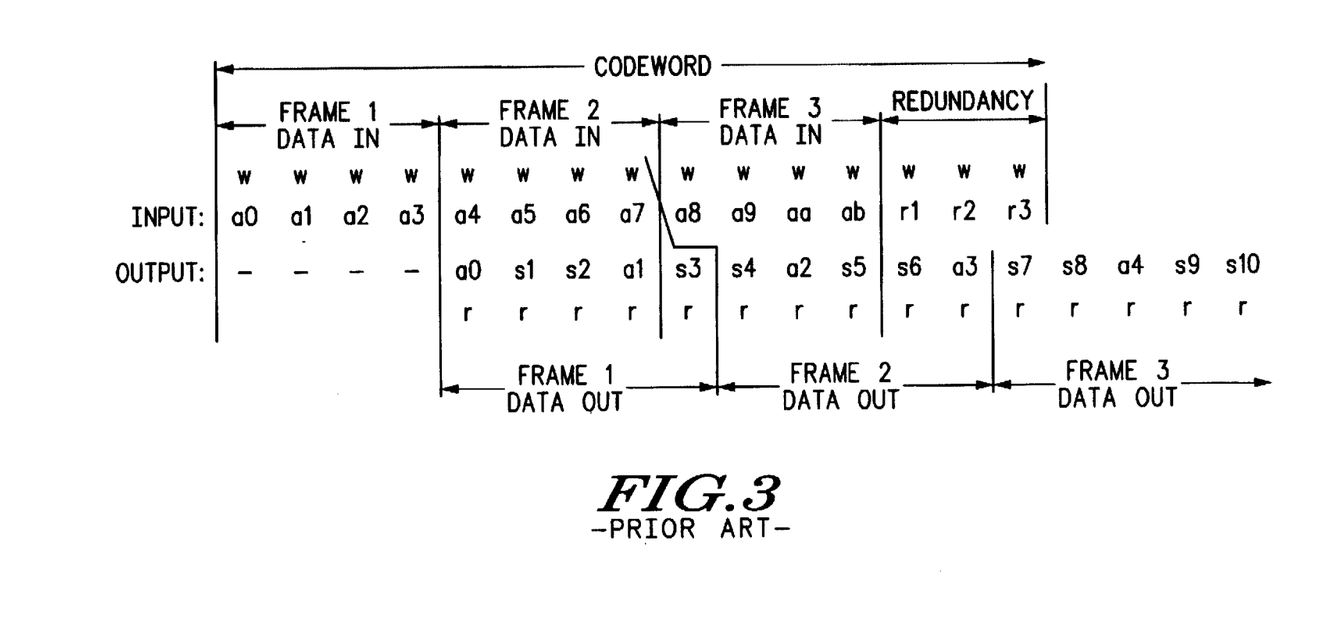
FIG. 3 illustrates the interleaver input and output over several frame periods to demonstrate a problem of latency in conventional interleaving processes.

In many circumstances, the basic data bytes of a codeword are spread out over several (S) transmission periods or frame periods, as indicated by FIG. 1. In this case, the redundancy bytes for the codeword are computed partially as each byte of data becomes available, but cannot be computed fully and added to the codeword until all the basic data bytes of the codeword have been received (i.e. until all S frame periods of data are available). As an example, assume a codeword is spread out over three frame periods (S=3), each frame contains 4 bytes of basic data prior to forward error correction encoding. As a result of performing forward error correction encoding, assume 3 bytes of redundancy data are added to form the total codeword. Note that the number of redundancy bytes (R) is a variable chosen by the user based on error correction requirements. FIG. 3 illustrates such a codeword structure, where a0 through ab are the basic data bytes or payload of the codeword and r1, r2, and r3 are the redundancy bytes.

The total codeword of 15 bytes (N=15) must still be spread over S frames after being interleaved, since the number of bytes in a frame must remain constant for correct processing by a constellation encoder. Thus, to equalize the size of each frame, each interleaver output frame must now contain 5 bytes (N/S) of information. But because bytes of data only arrive as a whole frame unit (i.e. data is not delivered on a byte-by-byte basis), there will be a one frame latency at the interleaver since a fifth byte has not yet arrived. For example, in reference to FIG. 3, the interleaver cannot process Frame1 because only (N−R)/S bytes (bytes a0 through a3) have arrived at the interleaver. Therefore, the interleaver must wait for Frame2 to arrive to receive a fifth byte of data (a4) before it can send the required 5 bytes of data.

While a one frame latency for the interleaved data may not seem problematic, given that the data will also experience a delay at the received end of the communication system for de-interleaving, the delay on the interleave path is critical because it also affects the transfer of data on the fast path. Fast path and interleave path frames have to align at the transmission end of the system before going to a constellation encoder. Therefore, the fast path data frame corresponding to the interleave path data frame is undesirably delayed by one frame as well. Accordingly, a need exists for method and apparatus to interleave data to avoid such a latency in the fast path.

DESCRIPTION OF A PREFERRED EMBODIMENT

Generally, the present invention provides a method for interleaving digital data in a manner which avoids the frame period latency associated with prior art techniques for interleaving forward error correction encoded data described above. A traditional interleaving operation performs a series of non-divisible write and read operations on data stored in memory to produce interleaved codewords. In other words, for every write operation, there is a corresponding read operation immediately thereafter. In certain instances it is not possible to perform all of the necessary write-read operations, since some of the data has not arrived for the write portion of the operation. This is due to the fact the information is transmitted as whole frames of data rather than as individual bytes. Thus, in order to perform such a non-divisible write-read operation, the interleaver must wait for the next frame of information to arrive in memory before proceeding. Consequently, the interleaving operation is delayed by one frame period. The present invention avoids this frame period delay by not waiting for the next frame of information, but instead departing from non-divisional write-read operations and performing at least one additional read operation without an immediately preceding or succeeding write operation.

Figure 4:
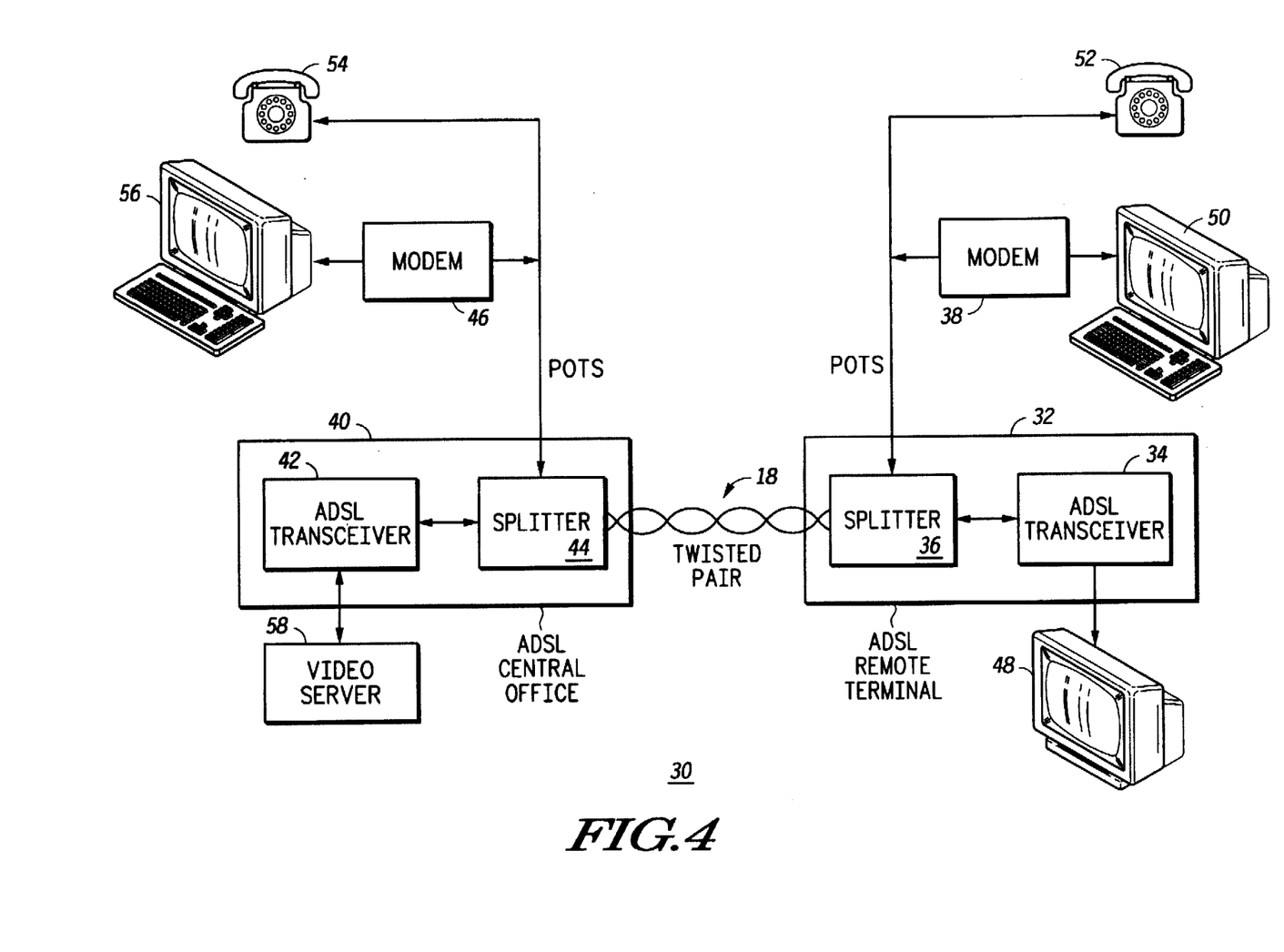
FIG. 4 illustrates, in block diagram form, an ADSL system which transmits data over a twisted pair, along with Plain Old Telephone Service (POTS), in accordance with the present invention.

The present invention can be more fully described with reference to FIGS. 4–9. FIG. 4 illustrates, in block diagram form, a communication system 30 which allows transmission of ADSL and Plain Old Telephone Service (POTS) over the same twisted pair according to the present invention. Communication system 30 includes ADSL central office 40 and ADSL remote terminal 32. ADSL remote terminal 32 includes ADSL transceiver 34 and splitter 36. Coupled to ADSL remote terminal 32 may be a communications device, such as television receiver 48. Twisted pair 18 couples the ADSL remote terminal 32 to the ADSL central office 40. Coupled to ADSL central office 40 may be a communications device, such as video server 58. ADSL central office 40 includes ADSL transceiver 42 and splitter 44. Splitter 44 couples ADSL transceiver 42 to twisted pair 18, and splits ADSL signals transmitted on POTS to the appropriate corresponding receiver. Splitter 36 functions in the same manner as splitter 44, but for ADSL transceiver 34.

Communications devices, such as a telephone 52 or a computer terminal 50 may be coupled over POTS to ADSL remote terminal 32. Likewise, a telephone 54 or a computer terminal 56 may be coupled over POTS to ADSL central office 40. Computer terminals 50 and 56 can be coupled via modems 38 and 46, respectively. In operation, communication system 30 allows simultaneous transmission of voice data for conventional telephony and ADSL signals on twisted pair 18. ADSL transceiver 42 uses a transmitter to transmit a downstream ADSL signal across twisted pair 18 to ADSL remote terminal 32. ADSL transceiver 34 and remote terminal 32 receive the downstream data signal from ADSL transceiver 42. ADSL transceiver 34 uses a transmitter to transmit an upstream ADSL signal across twisted pair 18 to ADSL central office 40. ADSL transceiver 42 and central office 40 receives the upstream data signal from ADSL transceiver 34. Transmitters of ADSL transceivers 34 and 42 as implemented in accordance with the present invention are described in more detail in reference to FIG. 5.

Figure 5:
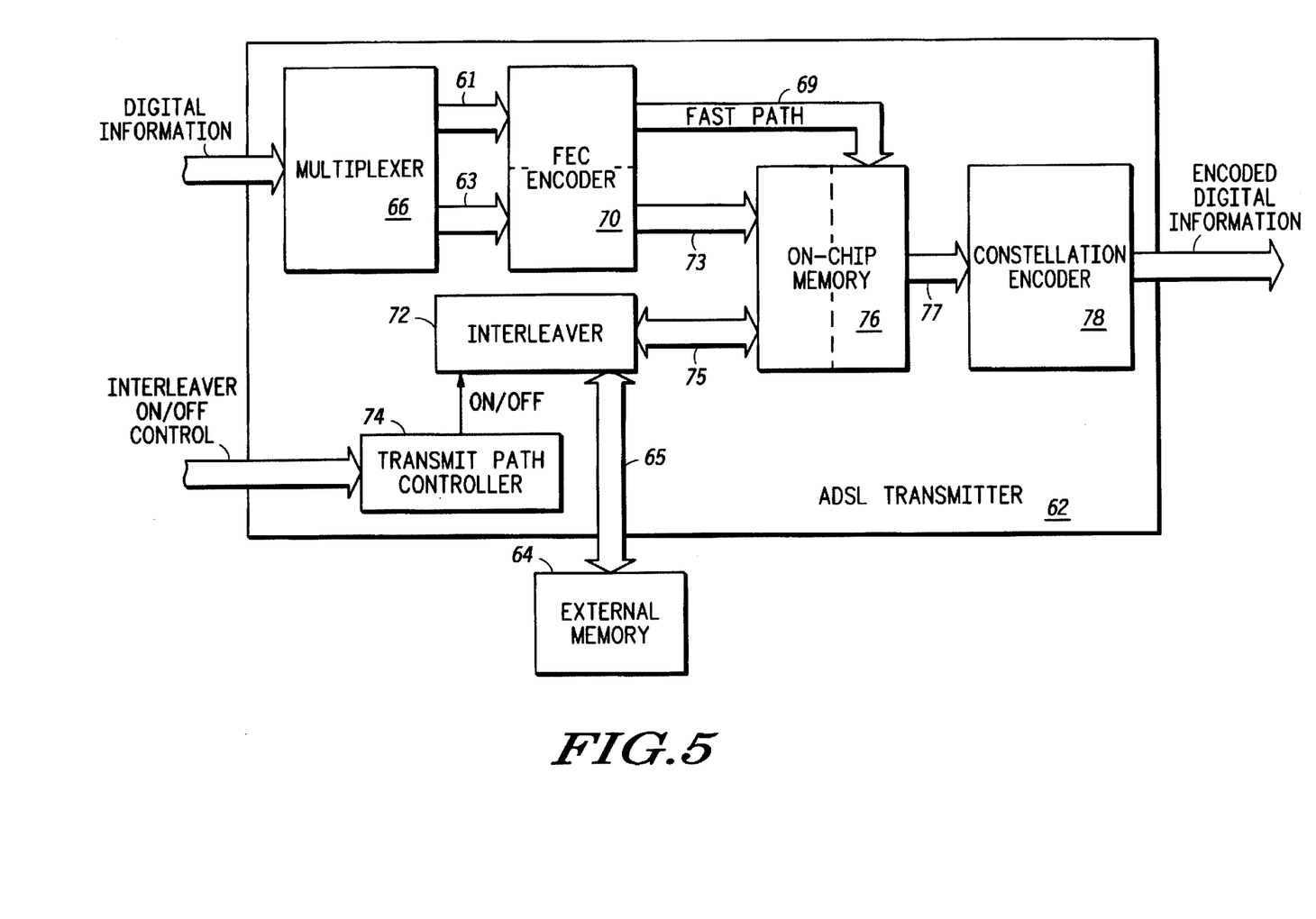
FIG. 5 illustrates, in block diagram form, an ADSL transmitter for use in an ADSL transceiver of FIG. 4, in accordance with the present invention.

FIG. 5 illustrates, in block diagram, form an ADSL transmitter 62, which forms a transmitting portion of each of ADSL transceivers 34 and 42 in accordance with one embodiment of the present invention. In a preferred embodiment of the invention, transmitter 62 is implemented as a single integrated circuit, but such is not a requirement of the present invention. ADSL transmitter 62 include a multiplexer 66, a forward error correction (FEC) encoder 70, an interleaver 72, a transmit path controller 74, on-chip memory 76, and a constellation encoder 78. Multiplexer 66 is uni-directionally coupled to FEC encoder 70 via a bus 61 and a bus 63. FEC encoder 70 is uni-directionally coupled to on-chip memory 76 by a bus 69 and a bus 73. On-chip memory 76 is bi-directionally coupled to interleaver 72 via a bus 75, which in turn is bi-directionally coupled to external memory 64 via a bus 65. On-chip memory 76 is also uni-directionally coupled to constellation encoder 78 via a bus 77. Transmit path controller 74 is also uni-directionally coupled to interleaver 72, for providing an On/Off signal to the interleaver.

In operation, ADSL transmitter 62 receives digital information, for example from a host processor (not shown), into multiplexer 66. Multiplexer 66 organizes the digital information into a series of bytes called frames and outputs these frames over busses 61 and 63 to FEC encoder 70. In a preferred embodiment, two frames are output from multiplexer 66 every frame period. One frame is sent through ADSL transmitter 62 along a "fast path" while the other frame is sent along an "interleave path." The fast path is so called simply because the data does not undergo the additional processing of interleaving, and therefore does not experience a delay imposed by de-interleaving at the receiving end of the communication system. In FIG. 5, bus 61 is for fast path data, while bus 63 is for interleave data.

After being multiplexed, forward error correction codes (redundancy bytes) are added to the frames by FEC encoder 70. While as illustrated, multiplexer 66 is coupled to an individual FEC encoder 70, two separate FEC encoders can be used, one for each path of data, as represented by the dashed line in FEC encoder 70 of FIG. 5. Within the FEC encoder, the frames of digital information are encoded for forward error correction using any one of a number of forward error correction techniques which involve redundancy. In a preferred embodiment, Reed-Solomon encoding is performed for error correction. But other techniques can instead be used, including BCH (Bose-Chadhuri-Hocquenghem) or Hamming (Parity Codes) techniques. In forward error correction encoding, redundant bytes of information are added to the basic data bytes to form a codeword, as explained previously, which helps the receiving end of the communication system compensate for errors which may be included in the received data by comparing the received basic data with the received redundancy data. Note that the codeword may be processed through FEC encoder 70 over multiple frames, such the redundancy bytes are added only after all the basic data bytes of the codeword are received by the FEC encoder. While waiting for bytes of basic data for a codeword from subsequent frames, the partial redundancy information for preceding and current frames can be stored in a buffer, either within the FEC encoder or elsewhere within transmitter 62. Forward error correction techniques as used in the present invention are the same as those used in the prior art. Therefore, further explanation of such techniques is not necessary.

After being encoded for forward error correction, the frames of data progress through ADSL transmitter 62 along one of two paths, either the fast path or the interleave path. Along the fast path, a unidirectional bus 69 transmits the data to a portion of on-chip memory 76 dedicated for fast path data. This data does not undergo an interleaving operation. Instead, the data is received by on-chip memory 76 and is held there until corresponding data on the interleave path has been interleaved and is also placed in on-chip memory 76. Thereafter, the forward error correction encoded data is sent as a frame to constellation encoder 78, and a new frame of data is input to FEC encoder 70 by multiplexer 66.

Data sent along the interleave path of ADSL transmitter 62 also proceeds to on-chip memory 76 from FEC encoder 70, particularly via a unidirectional bus 73. Such data is stored in a portion of the memory dedicated for interleaving data, which includes both data to be interleaved and data which has already been interleaved. Data to be interleaved is sent to interleaver 72 via a bi-directional bus 75. Interleaver 72 performs interleaving in accordance with transmission system requirements. For example, in an ADSL application convolutional interleaving is performed such that byte $B_i$ is delayed by $(D-1)*i$ bytes for any given codeword as explained previously. Because bytes of data are being delayed across multiple frame periods in an interleaving operation (at least when $D \geq 2$), memory is needed to store the data which is being delayed. Such memory can be provided on-chip, but the silicon area needed is somewhat extensive. As a general rule, the amount of memory needed equals N*D bytes, where D can be up to 1023 and N can be up to 255 in ADSL applications. Accordingly, in a preferred embodiment, interleaver memory is provided as an external memory 64. In a one embodiment, external memory 64 is a 256K×8 static random access memory (SRAM), but neither this size nor the fact that this interleaver memory is external is a requirement of the present invention. Data needing to be delayed as a result of the interleaving process is stored by writing such data to the external memory across bus 65. When the delay period for the data is over, the data is then read back by the interleaver from external memory 64 and written to on-chip memory 76. Once the interleave data is placed in on-chip memory 76, both the fast path data and interleave data are sent to constellation encoder 78 at the same time.

In accordance with the present invention, interleaver 72 performs the interleaving operation on the data received from on-chip memory 76 in a manner subsequently described in reference to FIG. 6. The interleaver then writes the resulting interleaved data to on-chip memory 76 also via bus 75. As noted above, however, interleaved data which is to be delayed is initially stored in external memory 64. Once the interleave data is written to on-chip memory 76, this data is sent to constellation encoder 78 in the next frame period, along with the next frame of fast path data residing in on-chip memory 76.

An exceptional case for treatment of data on the interleave path is when the depth of interleaving is equal to one (D=1). In this instance, the interleave path behaves as a second fast path since the bytes of data in the interleave path are delayed by 0 bytes. In such instance, in accordance with a prior art technique, the interleaver still runs its delay algorithm and accesses the calculated address locations in interleaver memory. The present invention eliminates external memory by recognizing that such interleaver memory accesses are unnecessary. Accordingly, the present invention permits the elimination of interleaver memory access when D=1. Elimination of the interleaver memory is particularly beneficial when such memory is external, as in a preferred embodiment of the invention. The particular manner in which interleaver memory access is avoided in accordance with present invention is described below.

At the end of each frame period, data is sent from on-chip memory 76 to constellation encoder 78. The constellation encoder assigns encoded symbols to each DMT subchannel. Each coded symbol is a complex number that represents the desired symbol in the constellation associated with the carrier used to transmit that data frame. Optionally, the data received by constellation encoder 78 may be trellis encoded prior to constellation encoding. After being encoded, digital information is transmitted from ADSL transmitter 62 to another block of the ADSL transceiver such as a digital signal processor (DSP) block of the transceiver. However, operations of the digital information outside of the ADSL transmitter block of the transceiver is not necessary for understanding the present invention and will thus not be described further.

Figure 6:
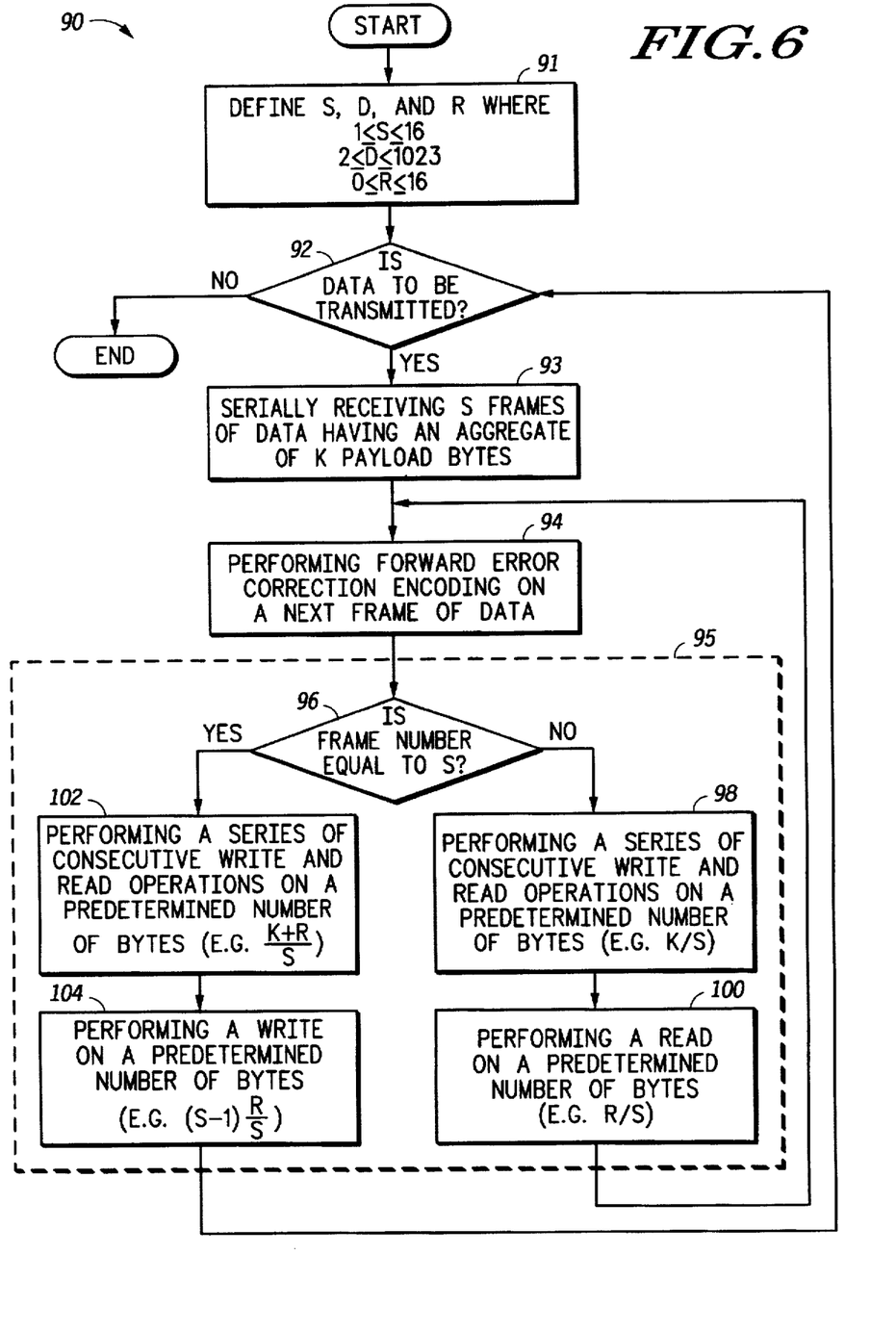
FIG. 6 illustrates, in flow diagram form, a method for interleaving data in an ADSL system in accordance with the present invention.

FIG. 6 is a flow diagram explaining a process 90 for how digital data proceeds through ADSL transmitter 62 in accordance with the present invention. More particularly, process 90 is a process for transmitted data along the interleave path of transmitter without the latency associated with prior art techniques. A first step 91 of process 90 is to define the interleave depth (D), the number of redundancy bytes (R) to be used for a codeword, and the number of frames over which a codeword is transmitted (S). In implementing the ADSL standard (T1E1.4-95-007R2), the boundaries set for these parameters is as follows: $1 \leq D \leq 64$, $0 \leq R \leq 16$ and $1 \leq S \leq 16$, where D, R, and S, are each an integer and R/S is an integer. In a preferred embodiment of a communication system of the present invention, can be as larger as 1023. However, as mentioned above, there is an exceptional case when D=1 in which the interleaving operation is avoided altogether with the present invention. Thus, first step 91 defines D within the bounds of $2 \leq D \leq 1023$.

After defining S, D, and R, a second step 92 of process 90 is a decision step to determine if there continues to be data needing to be transmitted. If "Yes," the process proceeds to a third step 93 which includes serially receiving S frames of data, wherein the number of basic data bytes (i.e. payload) in the S frames sums to an aggregate of K bytes. In reference to ADSL transmitter 62, the serial stream of data is the digital information being input into multiplexer 66 which is then organized and output as a series of flames of data.

After receiving the data, a fourth step 94 of process 90 is performing forward error correction encoding. Such encoding corresponds to the Reed-Solomon or other redundancy-type correction techniques described previously in reference to operation of FEC encoder 70 of transmitter 62. Error correction encoding is performed on a frame-by-frame basis, although frames of data to be sent along the fast path and of data to be sent along the interleave path may be error correction encoded simultaneously.

After encoding for forward error correction is performed, the data undergoes an interleaving operation. The interleaving operation includes a number of steps. In particular, interleaving includes steps 96, 98, 100, 102, and 104. Accordingly, these steps are grouped together in FIG. 6 by a dashed box 95 which represents the interleaving operation.

A first step of the interleaving operation is a decision step 96, where the frame number of the data being input into the interleaver is compared to S, the number of frames in a codeword. Decision step 96 determines whether the frame sent to the interleaver is the last frame of the codeword. If not the last (i.e. the current frame number is less than S), then the next step in process 90 is a step 98, wherein the interleaver performs a series of consecutive write and read operations on a predetermined number of bytes in the interleaver memory (e.g. external memory 64). In a preferred embodiment, the predetermined number of bytes is equal to K/S. After performing the write and read operations, a next step 100 is to perform a read operation of the interleaver memory, without a corresponding write operation to the same memory, on a predetermined number of bytes. In a preferred embodiment, the predetermined number of bytes in step 100 is equal to R/S and is an integer. At the end of step 100, the current frame has been interleaved, and process 90 proceeds to error correction encode and interleave the next frame of data by returning to step 94. After error correction encoding, decision step 96 again determines if this is the last frame of data for the current codeword. If "No," steps 98, 100, 94, and 96 are repeated until the current frame is the last frame of the current codeword (i.e. current frame number is equal to S).

In the case where the current frame is the last frame for the current codeword, the answer to decision step 96 is "Yes," and process 90 proceeds to a step 102. In step 102, the interleaving performs a series of consecutive write and read operations on a predetermined number of bytes of data. In a preferred embodiment, the predetermined number of bytes is equal to (K+R)/S. After performing the write and read operations of step 102, a next step 104 is to perform a write operation, without a corresponding read operation, on a predetermined number of bytes. In a preferred embodiment, the predetermined number of bytes in step 104 is equal to (S−1)R/S. At the end of step 104, all flames of the current codeword have been interleaved, and process 90 proceeds back to decision step 92 where a determination is made as to whether there continues to be data to be transmitted. If "Yes," another S frames of data for the next codeword are serially received by the ADSL transmitter and these frames are forward error correction encoded and interleaved as just described. If "No," process 90 ends.

Figure 7:
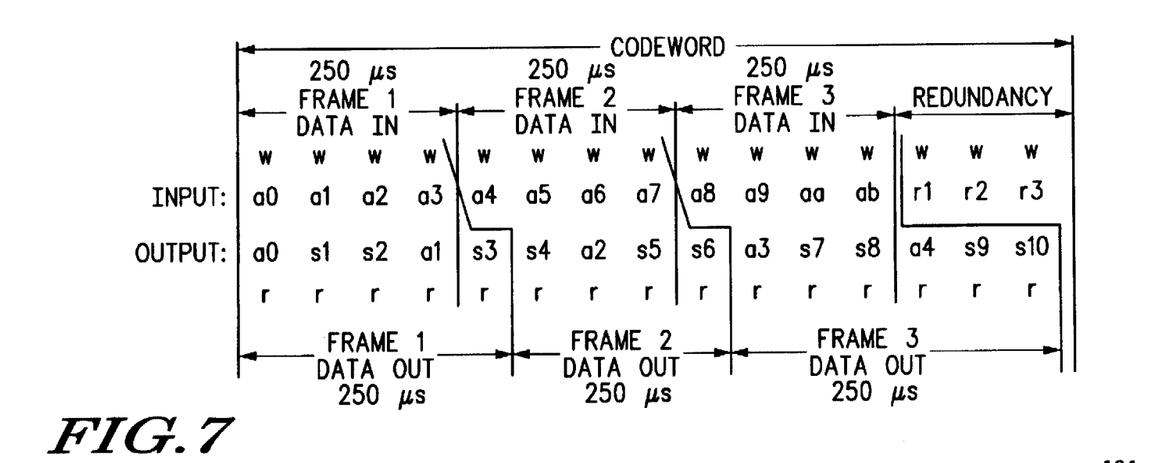
FIG. 7 illustrates inputs and outputs of an interleaver used in accordance with a particular embodiment of the interleaving method shown in FIG. 6.
Figure 8:
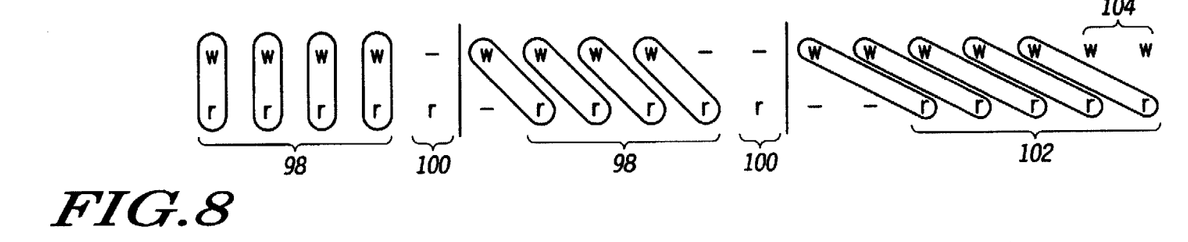
FIG. 8 is a simplified view showing the manner in which read and write operations are performed during the interleaving process in accordance with the embodiment of the present invention illustrated in FIG. 7.
Figure 9:
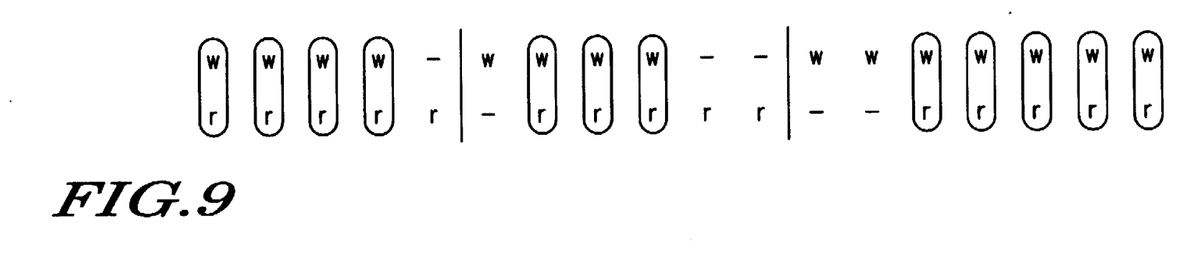
FIG. 9 illustrates an alternative sequence of read and write operations for performing an interleave operation, also in accordance with the present invention.

To better understand the manner in which the interleaving operation of process 90 avoids the latency problem discussed above, attention is directed to FIG. 7. FIG. 7 illustrates how a codeword is input into an interleaver, and then output from the interleaver. The figure also shows the associated write and read operations during the interleaving process in accordance with the present invention. The codeword illustrated includes 12 bytes of payload data (K=12), including bytes a0 through ab, and 3 bytes of redundancy data (R=3), including bytes r1 through r3. The number of flames for the illustrated codeword is three (S=3).

How the codeword of FIG. 7 is interleaved according to process 90 of FIG. 6 will now be explained. For the illustrated codeword, S, D, and R are each defined as being equal to three. Three flames (S=3) of data having an aggregate of 12 bytes of payload data (K=12) are serially received, 4 bytes per frame period (illustrated as a period of 250 microseconds (μs)), for example from a multiplexer. The basic data is then forward error correction encoded, such that three bytes (R=3) of redundancy data, bytes r1, r2, and r3, are added to the K bytes of payload data in the last frame of the codeword. The codeword is now complete and interleaving proceeds in stages as each of the S frames arrives.

With the addition of the redundancy bytes, the number of bytes per frame period output from the interleaver is increased to (K+R)/S, or 5 bytes. But, if the output from the interleaver for the first frame (Frame1) must be 5 bytes, only 4 bytes (a0 through a3) have been input to the interleaver in Frame1. In a prior art interleaving technique (non-divisible write-read operations), the interleaving operation waited until the next frame of bytes (a4 through a7) arrived to proceed with interleaving. Thus, interleaving in accordance with the prior art would create a one frame latency as explained above.

In accordance with the present invention, the interleaving operation proceeds, even though the first 5 bytes from the current codeword have not arrived. Note that not all 5 bytes from the first frame of the codeword need to be output from the interleaver in the first frame period. In the example illustrated, where D=3, only two bytes (a0 and a1) will be output from the interleaver in the initial output frame period, Frame1. Therefore, there is no need to wait for the next frame of bytes (a4 through a7) to arrive. Nonetheless, 5 bytes of data must be output from the interleaver. In accordance with the present invention, the 3 remaining byte slots are filled with data stored in memory from a previous interleaved codeword. As illustrated in FIG. 7, the remaining three byte slots are filled with s1, s2, and s3. By utilizing bytes previously stored in memory from a formerly interleaved frame or frames, the present invention avoids the initial one frame latency for each frame associated with prior art techniques.

In reference to the steps of process 90 of FIG. 6, Frame1 arrives at the interleaver, and the frame number is not equal to S (1≠3), so the interleaver performs a series of consecutive write and read operations on a predetermined number of bytes, in particular on K/S or 4 bytes. The 4 write and read operations performed on the codeword of FIG. 7 corresponding to step 98 of process 90 is illustrated more simply in FIG. 8. Then, a read operation is performed on R/S or 1 byte of data, illustrated in FIG. 8 as step 100. By performing at least one read operation, without corresponding write operations, the interleaver need not wait for the next frame of data to arrive and avoids latency.

The next frame of data bytes (a4 through a7) arrives in the next frame period (Frame2). Error correction is performed in accordance with step 94, and again the result of decision step 96 is "No," since 2≠3. Write and read operations are again performed on 4 bytes of data, as shown by the second occurrence of step 98 in FIG. 8. Then, a read of 1 byte of data is performed, without a corresponding write operation, as demonstrated by the second occurrence of step 100 in FIG. 8. Next, according to process 90, error correction is performed on a next frame of data, which happens to be the last frame of data (Frame3). Thus, the result of decision step 96 is "Yes," and the interleaving operation proceeds to step 102. Here, a series of consecutive write and read operations is performed on a predetermined number of bytes, where the number of bytes equals (K+R)/S, or 5 bytes of data. Finally, a write operation, without a corresponding read, is performed on (S−1)R/S or 2 bytes of data to conclude interleaving for these 3 frames. The write operations of step 104 are performed to compensate for the previous read operations which were performed without corresponding write operations. In the particular example illustrated, a total of 2 bytes of data were read in the occurrences of step 100, therefore 2 bytes of data were written in step 104.

In the particular embodiment of the present invention described above in reference to FIGS. 6, 7, and 8, at least one additional read operation was performed at the end of all but the last frame. At the last frame, additional write operations were performed to compensate for the previous additional reads. In another embodiment of the present invention, additional write operations are performed immediately following the additional read operations, as demonstrated in FIG. 9. After performing the series of consecutive write and read operations of step 98, and performing the additional read operation of step 100, an additional write operation is then performed for the same number of bytes as the additional read operation. In other words, the write-only operations are performed immediately after any read-only operations, rather than performing compensating write-only operations all at once in the last frame. Note that in the embodiment demonstrated in FIG. 9, the order of steps and the equations for the predetermined number of bytes to be read or written changes from the examples given in process 90. For example, the process flow and the equations become dependent upon the frame number, making the calculations more complex. However, the general concept of performing a series of consecutive write and read operations on a predetermined number of bytes, followed by at least one additional read operation without a corresponding write operation, remains the same.

Earlier, reference was made that in accordance with the present invention there is an exceptional case when the interleave depth (D) is equal to 1. The reason is as follows. When D=1, effectively, no interleaving takes place since the amount of delay for byte $B_i$ is equal to $(D-1)*i$ bytes or 0 bytes. Since the interleaving operation need not take place when D=1, the present invention enables disablement of the interleaving operation to avoid memory access in sending data through ADSL transmitter 62. Referring again to FIG. 5, transmitter 62 includes a transmit path controller 74. Transmit path controller 74 monitors the depth to which incoming data is to be interleaved (D). If controller 74 detects that D=1, for example as set by a host processor, the controller sends a control On/Off signal to interleaver 72 to turn the interleaving operation off. Upon being turned off, data still is sent through the interleave path of the transmitter. However, such data merely passes into the on-chip memory 76 without undergoing an actual interleaving operation. Thus, one is able to transmit all data as if sent through the fast path, despite the fact that ADSL standard (T1E1.4-95-007R2) requires data to be divided into both a fast path and an interleave path. Because no access to the external memory is made when D=1, external memory 64 is optional if using ADSL transmitter 62 and the data being transmitted need not be interleaved.

From the foregoing, it is apparent that there has been provided a method and apparatus for interleaving data in a communications transmitter which avoids the initial one frame latency associated with prior art techniques for interleaving forward error correction encoded data. The present invention achieves this by performing at least one additional read operation, without an associated write operation, after a series of consecutive write and read operations. The additional read operation reads one or more bytes of data from a previously stored frame of a codeword, so that the current frame of data of the current codeword can be interleaved without waiting for additional bytes of the current codeword to arrive at the interleaver. The at least one additional read operation is then compensated for by performing an additional number of write operations, equal in number to the additional reads, either all at once in the last of S flames of data or periodically in successive flames. Not only is a one frame latency avoided by interleaving in accordance with the present invention, but further interleaving delay can be avoided entirely when the application warrants a higher data transmission rate at the expense of a possible higher error rate, for example in internet applications. In particular, interleaving delay can be avoided by setting the interleave depth (D) equal to 1, and causing the interleaver to be turned off or disabled. Consequently, accesses to the interleaver memory (be it internal or external memory) are avoided and data can be sent along the interleave path of the transmitter at a rate equal to the data being sent along the fast path. Because there is no access to the interleaver memory in such instance, such memory can be eliminated in certain applications, thereby saving cost and space in a communication system.

While the invention has been described in the context of a preferred embodiment, it will be apparent to those skilled in the art that the present invention may be modified in numerous ways and may assume many embodiments other than that specifically set out and described above. For example, one skilled in the art will recognize the present invention can be implemented through dedicated hardware, software, or a combination of both. Furthermore, it is understood that while the present invention has been described in reference to a particular sequence of write and read operations, different sequences of memory operations can be used to perform the same function. For example, write operations can be used in place of reads, and vice versa. In addition, it is understood that while "byte" has been used herein, no particular number of bits of data need comprise a byte. A word of any length can be used. It is also important to note that while the particular examples provided herein have used frames of data having an equal number of bytes per frame, such is not a requirement of practicing the present invention. Nor is it a requirement that there be a constellation encoder in the communication system. The present invention would provide the same benefits for transmission of data through the interleave path to any post-processor which requires a larger number of bytes per frame than are delivered to the interleaver during a frame. Similarly, it is noted that the present invention is not limited to use in an ADSL communication system. Accordingly, it is intended by the appended claims to cover all modifications of the invention which fall within the true spirit and scope of the invention.

What is claimed is:

1. A transmitter for interleaving data comprising:

means for receiving digital information, and for selectively dividing the digital information between a fast path and an interleave path to produce a plurality of frames of data;

a forward error correction encoder, coupled to the fast path and to the interleave path, for providing error correction to the plurality of frames to produce codewords in both the fast path and the interleave path, wherein each codeword is comprised of a plurality of bytes of data; and an interleaver, coupled to the forward error correction encoder, for interleaving the plurality of bytes of data in a codeword allocated to the interleave path by changing an order of write-read operations by inserting at least one additional read operation in at least one of the plurality of frames to produce an interleaved plurality of frames.

2. The transmitter of claim 1, further comprising a storage element, coupled between the forward error correction encoder and the interleaver for buffering the plurality of bytes of data in the codeword.

3. The transmitter of claim 1, further comprising a storage element coupled to the interleaver, for temporarily storing at least some of the plurality of bytes of data of the codeword for subsequent transmission.

4. The transmitter of claim 3, further comprising a transmit path controller for selectively disabling at least a portion of the interleaver and bypassing the storage element.

5. The transmitter of claim 4 wherein an amount of interleaving is determined by an interleave depth, and when the interleave depth is equal to one, the transmit path controller disables the interleaver.

6. The transmitter of claim 5 wherein the interleave path is reconfigured to bypass the storage element in a case when the interleave depth is equal to one.

7. The transmitter of claim 6 wherein the transmitter is implemented as a single integrated circuit and the storage element is characterized as being external to the transmitter.

8. The transmitter of claim 4 wherein the interleaver transfers a frame without interleaving the frame and bypasses the storage element.

9. The transmitter of claim 1 wherein the interleaver adds a number of write operations at an end of the codeword, wherein the number of write operations is equal in number to the at least one additional read operation.

10. The transmitter of claim 1 wherein the transmitter is an asymmetric digital subscriber line (ADSL) transmitter.

11. The transmitter of claim 10 wherein the means for receiving digital information comprises a multiplexer.

12. The transmitter of claim 10 further comprising a constellation encoder, coupled to the interleave path and to the fast path, the constellation encoder for producing encoded symbols.

13. An asymmetric digital subscriber line (ADSL) transmitter, comprising:

a multiplexer for receiving digital information, and for selectively dividing the digital information between a fast path and an interleave path to produce a plurality of flames of data;

a forward error correction encoder, coupled to the fast path and to the interleave path, for providing error correction to the plurality of frames to produce codewords in both the fast path and the interleave path, wherein each codeword is comprised of a plurality of bytes of data;

an interleaver, coupled to the forward error correction encoder, for interleaving the plurality of bytes of data in a codeword allocated to the interleave path;

a transmit path controller coupled to the interleaver for selectively disabling at least a portion of the interleaver and for permitting bypass of an interleaver storage element; and a constellation encoder, coupled to the interleave path and to the fast path, the constellation encoder for producing encoded symbols.

14. The ADSL transmitter of claim 13 wherein the ADSL transmitter is implemented as a single integrated circuit and the interleaver storage element is characterized as being external to the ADSL transmitter, and wherein when an interleave depth is equal to one, the interleave path is configured to bypass the interleaver storage element.

15. A method for interleaving bytes of data in a plurality of codewords, the method comprising the steps of:

serially receiving S frames of data having an aggregate of K bytes, where S is a total number of frames in one codeword of the plurality of codewords, and where K and S are integers;

performing forward error correction encoding on the S frames to produce the one codeword wherein the one codeword comprises K+R bytes of data, where R is a total number of redundancy bytes in the one codeword and is an integer, and where R/S is an integer;

performing a series of consecutive write and read operations on a first predetermined number of bytes in the plurality of codewords;

performing consecutive read operations on a second predetermined number of bytes of the plurality of codewords;

determining that a last frame of the S flames is received and performing at least one consecutive write and read operation on a third predetermined number of bytes of the plurality of codewords; and performing a write operation on a fourth predetermined number of bytes of the one codeword.

16. The method of claim 15 wherein the first predetermined number is equal to K/S, the second predetermined number is equal to R/S, the third predetermined number is equal to (K+R)/S, and the fourth predetermined number is equal to (S−1)R/S.

17. A method for interleaving data arranged in flames, the method comprising the steps of:

serially receiving S frames of data having an aggregate of K words, where S is a total number of flames in a codeword, and where K and S are integers and K/S is an integer;

performing forward error correction encoding on the S flames to produce the codeword;

providing a storage element; and interleaving a plurality of bytes of the codeword by accessing the storage element for a plurality of first operations and a plurality of second operations wherein the plurality of first operations is equal in number to the plurality of second operations, and wherein the storage element is accessed for at least one additional second operation for a frame of the codeword.

18. The method of claim 17 wherein the plurality of first operation is a plurality of write operations and the plurality of second operations is a plurality of read operations.

19. The method of claim 17 wherein the step of interleaving comprises the steps of:

accessing the storage element for a series of consecutive first and second operations for a first predetermined number of times;

accessing the storage element for a second predetermined number of consecutive second operations to the storage element;

determining that a last frame of the S flames is received and performing at least one consecutive first operation and second operation on a third predetermined number of times; and accessing the storage element for a fourth predetermined number of first operations, wherein the fourth predetermined number is a function of the second predetermined number.

20. The method of claim 19 wherein the series of consecutive first and second operations comprises a series of write and read operations.

21. The method of claim 19 wherein as a result of performing forward error correction encoding, R bytes of redundancy data are included in the codeword, where R is an integer, and wherein the first predetermined number is equal to K/S and the second predetermined number is equal to R/S.

22. The method of claim 21 wherein the third predetermined number is equal to (K+R)/S and the fourth predetermined number is equal to (S−1)R/S.

23. The method of claim 17 wherein the step of interleaving comprises the steps of:

accessing the storage element for a series of consecutive first and second operations to produce a first interleave frame;

accessing the storage element for a first predetermined number of second operations and adding the first predetermined number of second operations to an end of the first interleave frame; and accessing the storage element for a second predetermined number of first operations which is a function of the first predetermined number of second operations, and adding the second predetermined number of first operations to a second interleave frame subsequent to the first interleave frame.

24. The method of claim 23 wherein the series of consecutive first and second operations comprises a series of consecutive write operation and read operations.

25. The method of claim 23 wherein the first predetermined number is equal to R/S.

* * * * *